United States Patent Office 2,977,360

Patented Mar. 28, 1961

2,977,360

PREPARATION OF S-TRIAZINE-2,4,6(1H,3H,5H)-TRIONES

Stanley Dixon, Brandywine Hundred, Del., assignor to E. I. du Pont de Nemours and Company, Wilmington, Del., a corporation of Delaware No Drawing. Filed Apr. 13, 1959, Ser. No. 805,669

4 Claims. (Cl. 260—248)

This invention relates to the formation of s-triazine-2,4,6(1H,3H,5H)triones and more particularly to the formation of these triones from organic isocyanates using epoxides as catalysts.

It is an object of this invention to provide a new catalytic process for preparing s-triazine-2,4,6(1H,3H,5H)-triones. A further object is to provide a process for preparing these triones from organic isocyanates using epoxides as catalysts. Other objects will appear hereinafter.

These and other objects of this invention are accomplished by a process for preparing s-triazine-2,4,6(1H,3H,5H)triones by contacting an organic isocyanate and/or a dimer thereof with a catalytic amount of an organic epoxide. More specifically this process is a trimerization reaction and involves contacting an organic isocyanate and/or a dimer thereof with an organic epoxide at a temperature of from about 150 to 250° C. under autogenous pressure, there being employed from about 0.025 to 0.15 mole and 0.05 to 0.3 mole of epoxide for each mole of isocyanate or dimer thereof respectively. The epoxide catalyst is subsequently removed by conventional means to recover the s-triazine-2,4,6(1H,3H,5H)trione thereby obtained.

In general any organic monoisocyanate may be used in the process of this invention provided it is free from substituents which react with epoxides. These isocyanates may be represented by the formula R—NCO, wherein R is an organic radical which is free of epoxide reactable groups, such as an aliphatic, aromatic, mixed aliphatic-aromatic radical or an organic polymer radical. Representative organic isocyanates include methyl isocyanate,
chloromethylisocyanate,
ethyl isocyanate,
β-chloroethylisocyanate,
butylisocyanate,
tert-butylisocyanate,
octylisocyanate,
octadecylisocyanate,
cyclopentylisocyanate,
cyclohexylisocyanate,
2,5-dimethylcyclohexylisocyanate,
2-methoxycyclohexylisocyanate,
allylisocyanate,
pentenylisocyanate,
phenylisocyanate,
p-chlorophenylisocyanate,
o-tolylisocyanate,
m-nitrophenylisocyanate,
m-bromophenylisocyanate,
p-methoxyphenylisocyanate,
p-carbomethoxyphenylisocyanate,
4-biphenylisocyanate,
p-dimethylaminophenylisocyanate,
4-ethyl-6-nitro-o-tolylisocyanate,
m-fluorophenylisocyanate,
2,3,5,6-durylisocyanate, 2,4,6-mesitylisocyanate,
1-naphthylisocyanate,
2-naphthylisocyanate,
5-nitro-1-naphthylisocyanate,
4(4-pentenyl)-phenylisocyanate,
3-isocyanatopyrene,
benzylisocyanate,
3-chlorobenzylisocyanate, and
4-ethoxybenzylisocyanate.

The isocyanate-terminated polymers include polyethers, polyesters, polyformals, poly-N-alkyl substituted amides, polyester-N-alkyl substituted amides, poly-N-alkyl substituted ureas, poly-N-alkyl substituted urethanes, polyaldehydes and polycarbonates. It is preferred that these polymers have molecular weights below 10,000. In general any organic isocyanate may be used so long as the organic radical is free of any epoxide reactive groups. Such groups include all groups bearing hydrogen atoms which are active as determined by the Zerewitinoff test, i.e., such groups as acetamido, acetimido, amino, amido, carbamyl, carboxyl, diazoamino, hydrazino, hydrazo, hydrazono, hydroxamino, hydroxyl (alcoholic, phenolic), imido, imino, isonitro, isonitroso, mercapto, nitroamino, oxamyl, phosphinico, phosphino, phosphono, selenino, selenono, selenyl, silicono, stibinico, stibino, stibono, stibylene, sulfamino, sulfamyl, sulfino, sulfo, thiocarbamyl, triazeno, ureido, ureylene, and urethaneo. The aromatic isocyanates are preferred. Mixtures of these isocyanates may be used.

In place of part or all of the organic isocyanates, the corresponding dimers may be used. These dimers are known as 1,3-diazacyclobutane-2,4-diones and have the structure

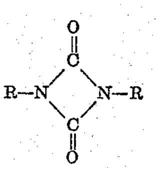

wherein R is as defined above. The R's need not be the same. Representative isocyanate dimers include:

1,3-bis(4-ethoxyphenyl)-1,3-diazacyclobutane-2,4-dione,
1,3-bis(m-tolyl)-1,3-diazacyclobutane-2,4-dione,
1,3-diphenyl-1,3-diazacyclobutane-2,4-dione,
1,3-bis(3-chlorophenyl)-1,3-diazacyclobutane-2,4-dione,
1,3-bis(4-biphenyl)-1,3-diazacyclobutane-2,4-dione,
1,3-bis(4-bromophenyl)-1,3-diazacyclobutane-2,4-dione,
1,3-dinaphthyl-1,3-diazacyclobutane-2,4-dione and
1,3-pyrenyl-1,3-diazacyclobutane-2,4-dione.

Under the conditions of the subject process, these dimers dissociate to provide the parent organic isocyanate R—NCO, or isocyanates, when the R's are different. The dimers are prepared by contacting organic isocyanates with certain catalysts such as trialkyl phosphines, pyridine, or triethylamine. Mixtures of these dimers may be employed.

The epoxide catalysts which are used in the process of this invention may be represented by the formula

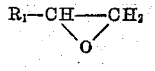

wherein $R_1$ is a monovalent radical selected from the group consisting of hydrogen, methyl, chloromethyl and phenyl radicals. Thus, the catalysts include ethylene oxide, 1,2-propylene oxide, epichlorohydrin and styrene oxide.

The amount of catalyst to be used should range from about 0.025 to 0.15 mole per mole of organic isocyanate.

When the dimer or 1,3-diazacyclobutane-2,4-dione is used the amount of catalyst should be twice as much since the dimer dissociates to provide two molecules of organic isocyanate. The preferred amount of catalyst ranges from about 0.10 to 0.15 mole per mole of organic isocyanate. When less than about 0.025 mole of catalyst is used, the yields of s-triazine-2,4,6(1H,3H,5H)trione are not as great. Amounts greater than 0.15 mole result in the formation of by-products.

The temperature for carrying out the process of this invention may range from about 150° to 250° C., with a temperature of from about 200° to 220° C. being preferred. In general the trimerization reaction is complete in from about 1 to about 20 hours. When an aromatic isocyanate is used at a temperature of about 200° C. with about 0.135 mole of catalyst, the trimerization is complete in about 1 to 4 hours. The longer times may be required when aliphatic isocyanates are used or if a smaller proportion of catalyst is present or if the temperature is lower. The progress of the reaction may be followed by analysis for free isocyanate group content. In the event that an isocyanate dimer is substituted for the free isocyanate, the progress of the reaction may be similarly followed because the dimer will thermally dissociate at temperatures above about 150° C., the liberated isocyanate subsequently forming the triazine trione. When a volatile organic isocyanate is used, the pressure in the reactor will fall as the triazine trione concentration increases. In general, the reaction is operated at the pressure (often superatmospheric) exerted by the reaction mixture. Additional pressure is not required.

The reaction may be carried out in an autoclave or rocker bomb. In general, the reactor will have an inert lining such as glass, enamel, stainless steel or lead. In general, the organic isocyanate reactant and the catalyst are mixed at temperatures below about 150° C. and brought to the operating temperature by application of external heat. If the isocyanate reactant and catalyst are heated too rapidly, the trimerization reaction may get out of control, rapid temperature rise will occur and undesired by-products will be formed. If desired, the isocyanate and catalyst may be heated separately to the desired operating temperature and then slowly introduced in the proper proportions into an agitated reactor at the reaction temperature.

After the trimerization reaction is completed, the triazine trione formed is recovered by removing the catalyst, any unreactive organic isocyanate, and any by-products. Since the epoxide catalysts are quite volatile they can be readily removed at reduced pressure by distillation or flashing. Ethylene oxide, which boils at 10° C., is particularly advantageous to use. Since the organic isocyanates are much more volatile than the corresponding triazine triones, they can usually be separated from the latter without difficulty by fractional distillation. Often the triazine trione is insoluble in the organic isocyanate and separates as a crystalline mass which is easily collected by filtration.

The s-triazine-2,4,6(1H,3H,5H)triones which are prepared according to the trimerization process of the present invention may be represented by the formula

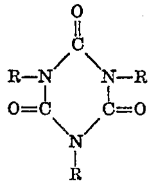

wherein R is derived from the organic isocyanate or dimer reactant and is as defined above. These triazine triones are useful as intermediates for producing condensation polymers such as polyurethane-type polymers and polyester resins. These triazine triones are described in U.S. Patent 2,838,511.

The following examples will better illustrate the nature of the present invention; however, the invention is not intended to be limited to these examples. Parts are by weight unless otherwise indicated.

*Example 1*

110 grams of phenyl isocyanate is agitated in a 400-cc. nickel-lined bomb for one hour at 230° C. Analysis of the contents for free isocyanate content, after cooling, indicates the presence of 98.1 grams of unreacted phenyl isocyanate. When this monomer has been distilled off (B.P. 59–61° C. at 14 mm. Hg), 0.5 grams of the isocyanate dimer 1,3-diphenyl-1,3-diazacyclobutane-2,4-dione is obtained melting at 184–185° C. No triazine trione is found.

This example shows that phenyl isocyanate does not trimerize in the absence of the epoxide catalyst.

*Example 2*

110 grams of phenyl isocyanate is introduced under a nitrogen atmosphere into a dry 400-cc. nickel-lined bomb at room temperature. External cooling is then applied and 5.5 grams of ethylene oxide distillate is collected in the bomb. Thereafter the bomb is closed and continually agitated by rocking. Heat is applied and the temperature is raised to 230° C. in 30 minutes. The bomb is agitated at 230° C. for 4 hours. External heat is then removed and the bomb is allowed to cool slowly to room temperature. Analysis of the product mixture for free isocyanate content indicates the presence of 29.3 grams of unreacted phenyl isocyanate. The mixture is then filtered. The crystalline residue collected is dissolved in 120 cc. of tetrahydrofuran, and diluted with 112 cc. of boiling n-hexane; on cooling, 16.1 grams of colorless prisms separate; they are recrystallized from a mixture of 45 cc. tetrahydrofuran and 25 cc. n-hexane to give 13.5 grams of triphenyl-s-triazine-2,4,6(1H,3H,5H)-trione melting at 280–282° C. The mother liquor from which the prisms separated is concentrated and diluted with n-hexane. After separating the precipitate, concentration of the diluted mother liquor yields 17.5 grams of brown powder which is recrystallized to give 3.3 more grams of the triazine trione.

*Example 3*

(A) 110 grams of phenyl isocyanate is introduced under nitrogen into a dry 400-cc. nickel-lined bomb at room temperature. The bomb is closed and cooled in a carbon ice bath. Vacuum is applied and 5.5 grams of ethylene oxide is distilled in. The bomb is closed. Thereafter agitation is continually maintained by rocking the bomb. Heat is applied and the temperature is raised to 200° C. in 70 minutes. The bomb is kept at 200° C. for 1 hour. External heat is removed and the bomb is allowed to cool slowly to room temperature. 109.4 grams of very hard gray-white solid is removed and dissolved in 700-cc. tetrahydrofuran. The solution is filtered while hot and the filtrate is concentrated to 400-cc. volume. 83.5 grams of triphenyl-s-triazine-2,4,6(1H,3H,5H)trione, M.P. 280–281° C., which separates, is collected by filtration. When the mother liquor is diluted with n-hexane, 21 grams of additional triazine trione separates.

(B) The procedure of part A above is repeated except that the reaction time at 200° C. is lengthened to 4 hours. On cooling, a sticky solid is removed; the bomb casing is rinsed with 300 cc. tetrahydrofuran. The sticky solid is then dissolved with heating in the rinse liquor and the solution obtained is filtered while hot. The filtrate on cooling deposits 46 grams of triphenyl-s-triazine-2,4,6(1H,3H,5H)trione melting at 280–281° C. When the mother liquor is diluted with n-hexane, a solid separates. Fractional recrystallization of this solid with hexane-tetrahydrofuran mixtures yields 15.9 grams of the triazine trione.

(C) The procedure of part A above is repeated except that only 1.2 grams of ethylene oxide is used. The product mixture removed after cooling the bomb is about three-fourths crystalline solid by weight; the remainder is liquid. This mixture is dissolved in about 600 cc. of tetrahydrofuran. Analysis for free isocyanate content indicates that 24.4 grams of unreacted phenyl isocyanate is present. When the solution is concentrated to a volume of about 300 cc., 74 grams of triphenyl-s-triazine-2,4,6(1H,3H,5H)trione separates melting at 282° C. Further concentration of the mother liquor and addition of n-hexane causes 14 more grams of the triazine trione to separate.

*Example 4*

(A) 110 grams of phenyl isocyanate and 5.5 grams of ethylene oxide are agitated in a dry 400-cc. nickel-lined bomb at 150° C. for one hour. On cooling, 112 grams of a brown liquid is removed which contains 100 grams of unreacted phenyl isocyanate (by free isocyanate analysis). On standing, 10.7 grams of triphenyl-s-triazine-2,4,6(1H,3H,5H)trione precipitates which melts at 280–282° C.

(B) The procedure of part A above is repeated except that the reaction is run for 16 hours. On cooling, 111 grams of a light brown liquid is removed which contains 86.7 grams of unreacted phenyl isocyanate (by free isocyanate analysis); on vacuum distillation 76.5 grams of phenyl isocyanate is collected; 28.8 grams of crystalline solid remains. Recrystallization from mixed n-hexane and tetrahydrofuran yields 10.9 grams of triphenyl-s-triazine-2,4,6(1H,3H,5H)trione.

(C) The procedure of part B above is repeated except that the reaction is run at 175° C. for 4 hours. Essentially the same results are obtained.

*Example 5*

(A) The procedure of part A of Example 3 is repeated except that 15 grams of styrene oxide is substituted for the 5.5 grams of ethylene oxide. The reaction product removed from the bomb is a dark sticky liquid. Recrystallization from a hot mixture of n-hexane and tetrahydrofuran gives 51.5 grams of triphenyl-s-triazine-2,4,6(1H,3H,5H)trione.

(B) The procedure of part A above is repeated except that the reaction time is lengthened to 16 hours. The product removed from the bomb is a brittle solid. It is dissolved in 500 milliliters of tetrahydrofuran and the solution obtained is subsequently concentrated to 350 milliliters. 7.6 grams of the trione separate. The mother liquor is further concentrated; addition of n-hexane to the concentrate causes 39.5 grams of solid to precipitate. Recrystallization of this solid from tetrahydrofuran yields 29.8 grams of the triazine trione. Further concentration of the above-mentioned mother liquor and dilution n-hexane yields an additional 1.7 grams of crude triazine trione.

*Example 6*

The procedure of part A of Example 3 is repeated except that 11.5 grams of epichlorohydrin is substituted for the 5.5 grams of ethylene oxide. 116 grams of a dark liquid (containing 74.8 grams of phenyl isocyanate) is removed from the bomb. Addition of n-hexane causes 21.3 grams of solid to deposit melting 180–250° C. Recrystallization from tetrahydrofuran yields 17.5 grams of the triphenyl-s-triazine-2,4,6(1H,3H,5H)trione.

*Example 7*

(A) The procedure of part A of Example 3 is repeated except that 7.3 grams of propylene oxide is substituted for the 5.5 grams of ethylene oxide. The amber liquid removed from the bomb analyzes for 7.24 meq. isocyanate per gram. The phenyl isocyanate contained therein is distilled off at 15 mm. Hg to give 15.2 grams of crystalline solid; recrystallization from a mixture of tetrahydrofuran and n-hexane yields 4.7 grams of the triphenyl-s-triazine-2,4,6(1H,3H,5H)trione.

(B) The procedure of part A above is repeated except that the reaction time is lengthened to 16 hours. A mushy solid is removed from the bomb. Analysis for free isocyanate indicates the presence of 18.1 grams of unreacted phenyl isocyanate. The product is dissolved in about 330 grams of tetrahydrofuran. Concentration causes precipitation of 29.5 grams of white crystals of the triphenyl-s-triazine-2,4,6(1H,3H,5H)trione. Further concentration of the mother liquor results in deposition of 24.9 grams of crude triazine trione.

*Example 8*

The procedure of part B of Example 3 is repeated except that 91.3 grams of butyl isocyanate is substituted for the 110 grams of phenyl isocyanate. The liquid product removed from the bomb contains no free isocyanate groups. Fractional distillation gives 61 grams of tributyl-s-triazine-2,4,6(1H,3H,5H)trione.

As many widely different embodiments of this invention may be made without departing from the spirit and scope thereof, it is to be understood that this invention is not limited to the specific embodiments thereof except as defined in the appended claims.

What is claimed is:

1. In the process for preparing s-triazine-2,4,6(1H,3H,5H)triones from an isocyanate compound, free of epoxide reactable groups, selected from the group consisting of an organic monoisocyanate, a 1,3-diazacyclobutane-2,4-dione and mixtures thereof, the improvement comprising contacting said isocyanate compound with an epoxide of the formula

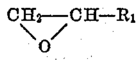

wherein $R_1$ is a monovalent radical selected from the group consisting of hydrogen, methyl, chloromethyl and phenyl, at a temperature of from about 150 to 250° C. under autogenous pressure, there being employed from about 0.025 to 0.15 mole of epoxide for each mole of said organic monoisocyanate and from about 0.05 to 0.3 mole of epoxide for each mole of said 1,3-diazacyclobutane-2,4-dione.

2. A process according to claim 1 wherein the organic monoisocyanate is a compound of the formula R—NCO, and the 1,3-diazacyclobutane-2,4-dione is a compound of the formula

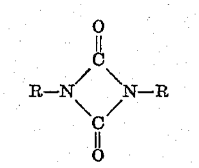

wherein R is an organic radical which is free of epoxide reactable groups.

3. A process according to claim 2 wherein the organic monoisocyanate is an aromatic monoisocyanate.

4. A process for preparing triphenyl-s-triazine-2,4,6(1H,3H,5H)trione which comprises contacting phenyl isocyanate with ethylene oxide at a temperature of from about 200–220° C. under autogenous pressure, there being employed from about 0.025 to 0.15 mole of ethylene oxide per mole of phenyl isocyanate.

(References on following page)

References Cited in the file of this patent

UNITED STATES PATENTS

| | | |
|---|---|---|
| 2,671,082 | Stallman | Mar. 2, 1954 |
| 2,683,144 | Balon et al. | July 6, 1954 |

FOREIGN PATENTS

| | | |
|---|---|---|
| 870,471 | France | Dec. 12, 1941 |

OTHER REFERENCES

Bergman: The Chemistry of Acetylene and Related Compounds, page 80, Interscience Publishers Inc., N. Y. (1948).

Saunders et al.: Chem. Reviews, vol. 43, pages 211 to 212 (1948).